Sept. 28, 1954   J. PETTY   2,690,158
LIVE FISH SORTING DEVICE
Filed Jan. 8, 1951
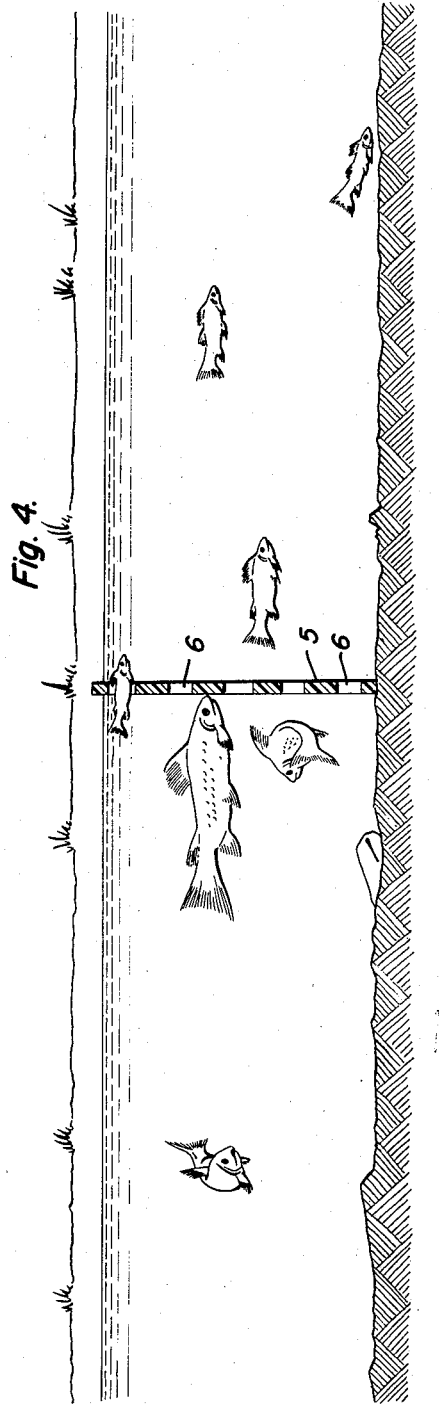
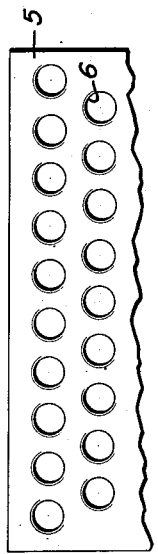
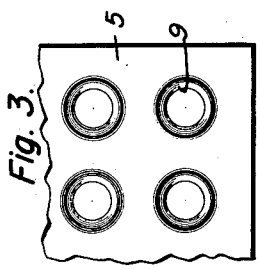
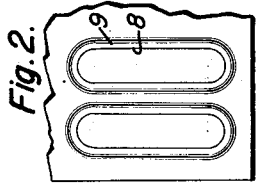
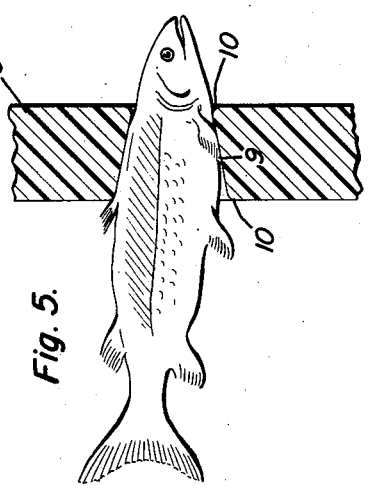
Joseph Petty
INVENTOR.

Patented Sept. 28, 1954

2,690,158

UNITED STATES PATENT OFFICE 2,690,158

LIVE FISH SORTING DEVICE

Joseph Petty, Ida, La.

Application January 8, 1951, Serial No. 204,915

2 Claims. (Cl. 119—3)

The present invention relates to new and useful improvements in devices for sorting minnows and other live bait to separate the same according to size.

An important object of the invention is to provide a screening device for accomplishing this purpose constructed of solid or sheet material having sorting openings for the passage of smaller bait and obstructing the passage of larger bait, whereby the same may be separated without handling.

Another object is to construct the sorting plate or sheet of suitable thickness whereby the fins of larger fish, in attempting to pass through the openings, will not become caught, thus permitting the fish to back out of the opening and to free itself without injury thereto.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part thereof, wherein like numerals refer to like parts throughout, and in which:

Figure 1 is a partial elevational view of the barrier plate from one side thereof;

Figure 2 is an enlarged partial view of a modified orifice shape seen from the other side of the plate;

Figure 3 is an enlarged partial view of the barrier plate of Figure 1 viewed from the opposite side;

Figure 4 is a vertical sectional view; and

Figure 5 is an enlarged fragmentary vertical sectional view disclosing the barrel rejecting a fish.

Referring now to the drawing in detail, wherein, for the purpose of illustration, I have disclosed several embodiments of my invention, the numeral 5 designates a screening device comprising a solid barrier plate or sheet of material and having a plurality of openings 6 therein.

The openings may be circular as shown in Figures 1 and 3, or oblong as shown at 8 in Figure 2, or other suitable shape depending on the type of fish to be screened, and both types of openings may be either straight, as indicated in Figure 1, or tapered, as shown at 9 in Figure 3.

The device is used preferably at minnow farms where water flows from one tank to another and the plate 5 is placed transversely of the flow so that smaller minnows may freely pass through the openings and the passage of larger fish is obstructed, to thus separate the same according to size.

The plate is of a substantial thickness, so that, should the body of the fish be too large to pass through the opening, the gills and fins will not become caught and the fish may then back clear of the opening without injury thereto.

As will be seen in Figure 5, the openings 9 are in the form of transverse, tapered bores extending through the thick walled plate body. Each bore is provided with a relatively large diameter entrance and a relatively small diameter exit with the entrance being on the face of the barrier disposed in the first segregation area of the stream while the exit opens on the face of the barrier disposed in the second segregation area. The thickness of the barrier is substantially greater than the size of the exit whereby, when a large fish as shown in Figure 5 attempts to move from the first segregation area to the second segregation area, it is halted from such passage by the relatively small size of the exit, but the taper of the bore and the thickness of the plate combine to permit the fish to back out of the barrier without damage to the gills or fins.

The plate is positioned so that the fish will enter the tapered side and the openings at both sides of the plate are countersunk as shown at 10 to further aid the fish in freeing itself.

The oblong openings 8 are shaped for use with fish having narrow bodies while the round openings are used with fish having round bodies.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fish segregation barrier for dividing a body of water into first and second segregation areas and providing a means whereby small fish up to a predetermined size may pass therethrough from the first into the second area while fish larger than the predetermined size will be excluded from passing through the barrier into the second area, said barrier comprising a rigid thick walled body having a plurality of transverse tapered bores therethrough, each bore having a relatively large diameter entrance and a relatively small diameter exit, said entrance being on the face of the barrier disposed in the first segregation area, said exit being on the face of the barrier disposed in the second segregation area, the thickness of the barrier being substantially greater than the size of the exit.

2. The combination of claim 1 wherein the entrances and exits are oval shaped, the smallest dimension of the exit being substantially less than the thickness of said barrier.

References Cited in the file of this patent
UNITED STATES PATENTS

| Number | Name | Date |
|---|---|---|
| 996,731 | Searles | July 4, 1911 |
| 1,082,998 | Briggs | Dec. 30, 1913 |
| 1,509,979 | Pryor | Sept. 30, 1924 |
| 1,552,063 | Kuehn | Sept. 1, 1925 |
| 2,361,321 | Schleier | Oct. 24, 1944 |
| 2,511,057 | Guthrie et al. | June 13, 1950 |
| 2,611,337 | Vibert | Sept. 23, 1952 |